United States Patent [19]

Isomura et al.

[11] Patent Number: 4,853,687

[45] Date of Patent: Aug. 1, 1989

[54] PROGRAMMABLE ADJUSTING SEAT CONTROL APPARATUS

[75] Inventors: Toru Isomura; Tomohiro Yamaji; Chikamasa Ikeda, all of Ayase, Japan

[73] Assignee: Ikeda Bussan Co., Ltd., Ayase, Japan

[21] Appl. No.: 137,332

[22] Filed: Dec. 23, 1987

[30] Foreign Application Priority Data

Dec. 24, 1986 [JP]   Japan .................................. 61-197435

[51] Int. Cl.$^4$ .......................... G05B 19/42; H04Q 3/02
[52] U.S. Cl. ....................... 340/825.300; 340/825.310; 340/825.560; 318/466; 364/424.05
[58] Field of Search ................... 340/825.3, 64, 825.31, 340/825.56; 318/568, 466, 103; 364/424

[56] References Cited

U.S. PATENT DOCUMENTS 4,477,874  10/1984  Ikuta et al. ...................... 340/825.31
4,698,571  10/1987  Mizuta et al. ........................ 318/568

*Primary Examiner*—Donald J. Yusko
*Assistant Examiner*—Brian S. Palladino
*Attorney, Agent, or Firm*—Foley & Lardner, Schwartz, Jeffery, Schwaab, Mack, Blumenthal & Evans

[57] ABSTRACT

A seat attitude control apparatus for adjusting a seat with respect to forward/backward position, reclining angle and others so that the attitudes of the seat appropriate to the figures of a plurality of specified occupants can be realized individually and separately. Seat attitude data thus obtained are registered in a microcomputer so as to be utilized for controlling the seat attitude appropriate to the actual occupant as specified, as occasion requires. The seat attitude data is erasable and fresh seat attitude data can be registered for another occupant. The seat attitude control is performed with the aid of one memory switch and four control switches disposed in an array convenient for manipulation.

7 Claims, 3 Drawing Sheets

PROGRAMMABLE ADJUSTING SEAT CONTROL APPARATUS

BACKGROUND OF THE INVENTION

The present invention relates generally to an apparatus for controlling or adjusting the configuration or attitude of a seat and more particularly to a seat attitude control apparatus for a motor vehicle which is capable of controlling a multiplicity of aspects or features of the seat. DESCRIPTION OF THE PRIOR ART With remarkable progress in the electronics technology in recent years, there exists an increasing tendency of adopting electronic control techniques in adjusting automatically the attitude or posture of a seat particularly for a motor vehicle. In reality, such a multi-aspect controllable seat has been already developed and used in practical applications in which many aspects of the seat such as, for example, position of the seat relative to the environment, inclination of the back, height of the cushion or others, positions of air-bag lumbar support, side supports, thigh support and others can be electrically controlled by using a seat slide mechanism, a reclining mechanism, height adjusting mechanism and aerodynamic systems and others.

In the hitherto known multi-aspect control system for a seat, a multiplicity of switches are provided on a side member of the seat in correspondence with the number of the aspects or parts of the seat to be controlled, wherein a desired control is performed by selecting and manipulating the associated one of the plural switches, relying on tactual selection in most cases, as is disclosed in Japanese Patent Application Laid-Open No. 53524/1983 (JP-A-58-53524). The number of these switches is increased in proportion to that of the objects to be controlled, which gives rise to many problems such as mentioned below.

As will be readily appreciated, provision of a large number of switches naturally involves troublesome procedure for selecting the desired one, involving the possibility that erroneous control operation might be performed by selecting unintentionally an inappropriate switch. When an occupant of the seat is replaced by another, the latter will have to selectively manipulate many switches one by one in order to reconfigure the seat conformable to him or her by relying on the bodily sensation, which requires very troublesome procedure.

SUMMARY OF THE INVENTION

The present invention provides a seat control apparatus which comprises a plurality of seat attitude control means, means for storing seat attitude data appropriate to figures of specified occupants separately for each of the occupants, the seat attitude data being obtained through the seat attitude control means, means for reconfiguring the attitude of the seat on the basis of the seat attitude data stored in the storage means, means for erasing the seat attitude data stored separately for each of the occupants, display means for displaying actions of the seat attitude control means and indicating the specified occupants, and manipulation means for controlling the various means in a centralized manner.

With the arrangement of the seat control apparatus according to the invention, the control for adjusting various parts of the seat as well as registration of the seat attitude data appropriate to specified occupants of the seat derived from the adjusting control for each of the occupants, reconfiguration of the seat attitude for the actual occupant and erasure of the seat attitude data can be performed with a minimum number of switches in a centralized manner, whereby erroneous control (and hence erroneous operation) and troublesome procedure ascribable to the use of a large number of switches can be evaded, while the desired control operation can be conducted rapidly and reliably through much simplified procedure.

Accordingly, an object of the present invention is to provide a seat control apparatus capable of controlling a multiplicity of aspects of the seat with high reliability in a facilitated manner without involving erroneous operation.

Another object of the present invention is to provide the seat control apparatus of the type mentioned above which allows the objects for control to be visually monitored.

These and other objects, novel features and advantages of the present invention will be more apparent upon consideration of the following detailed description of the preferred embodiments thereof made by reference to the accompanying drawings.

DESCRIPTION OF THE PREFERRED EMBODIMENTS

Now, the present invention will be described in detail in conjunction with exemplary embodiment thereof by reference to the accompanying drawings.

Figure 1:
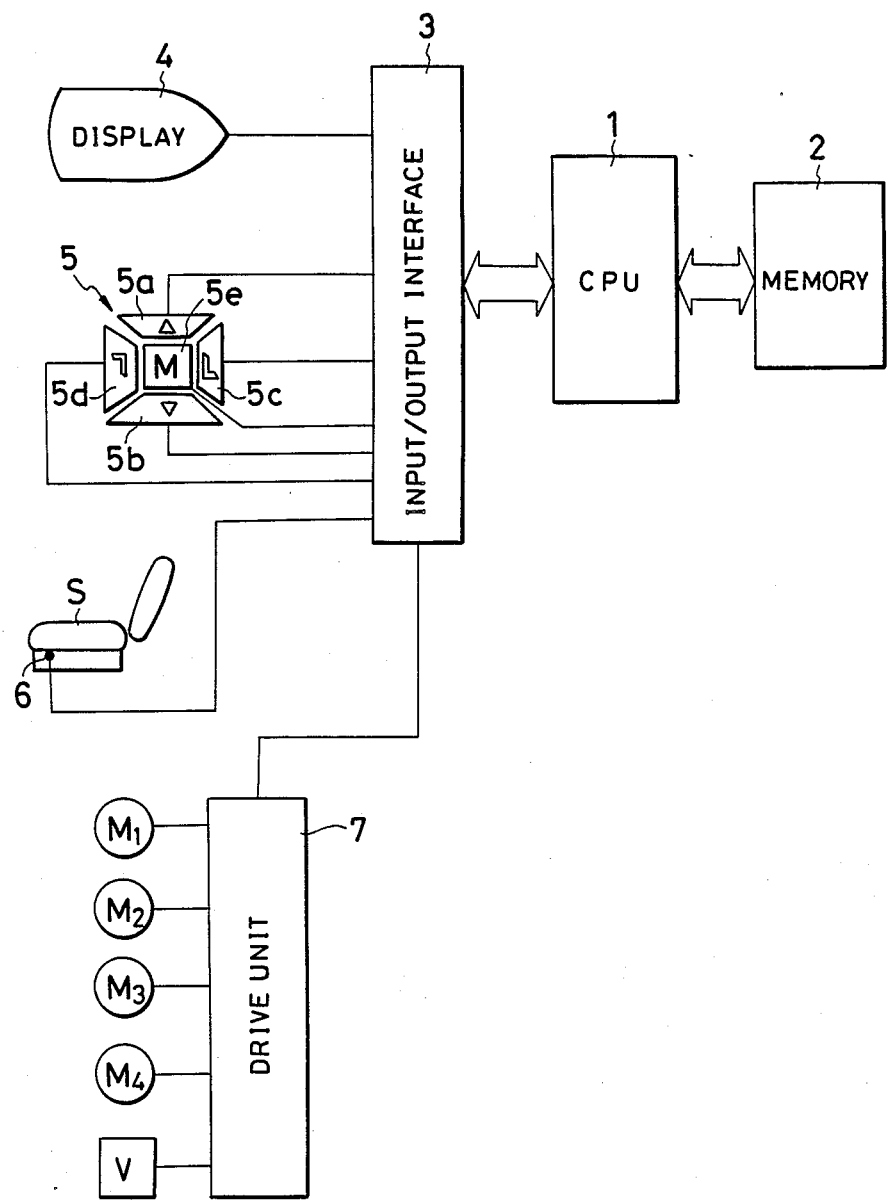
FIG. 1 is a view showing in a block diagram a general arrangement of a seat control apparatus according to an exemplary and preferred embodiment of the present invention.

Referring to FIG. 1 which shows schematically a general arrangement of the seat control apparatus according to an embodiment of the invention, a reference numeral 1 denotes a central control unit (hereinafter referred to a CPU in abbreviation) which performs overall control of the apparatus. A memory unit 2 and an input/output interface 3 are connected to the CPU 1. The input/output interface 3 serves to allow various signals and data to be transferred between the CPU 1 and various devices and mechanisms which may include a display device 4 of a liquid crystal type or CRT type, a control switch array 5, sensors 6 and a drive unit 7 for driving motors $M_1$, $M_2$, $M_3$ and $M_4$ and a solenoid valve in respose to commands issued by the CPU 1, as will be described in more detail hereinafter.

The control switch array 5 serves for commanding various control operations such as the sliding control of forward/backward position of the seat S (referred to as SLIDE control mode), adjustment of reclining angle (referred to as REC control mode), adjustment of height of the seat S (referred to as LIFT control mode) and angular adjustment of foot rest (referred to as FOOT control mode), wherein the SLIDE control, REC control, LIFT control and FOOT controls are performed by driving the associated reversible motors $M_1$, $M_2$, $M_3$ and $M_4$ in either one or the other direction. The control switch array 5 further serves to control the degree of projection of a lumbar support (referred to as LUMB control mode) which is performed through activation/deactivation of the solenoid valve V. Finally, the control switch array 5 is made use of for establishing the attitude of the seat on the basis of the seat attitude data obtained from these controls or adjustments as well as erasure of the data. To this end, the seat control switch array 5 includes five touch switches (e.g. panel switches, flat keyboard switches or the like) 5a, 5b, 5c, 5d and 5e. Each of these switches 5a to 5e is allotted with two or more different functions. As will be seen more clearly in FIG. 2, the individual switches are arrayed such that four control switches 5a, 5b, 5c and 5d enclose the switch 5e (referred to as the memory switch) which is disposed at the center so that they are arrayed compactly in a rectangular form as a whole.

Figure 2:
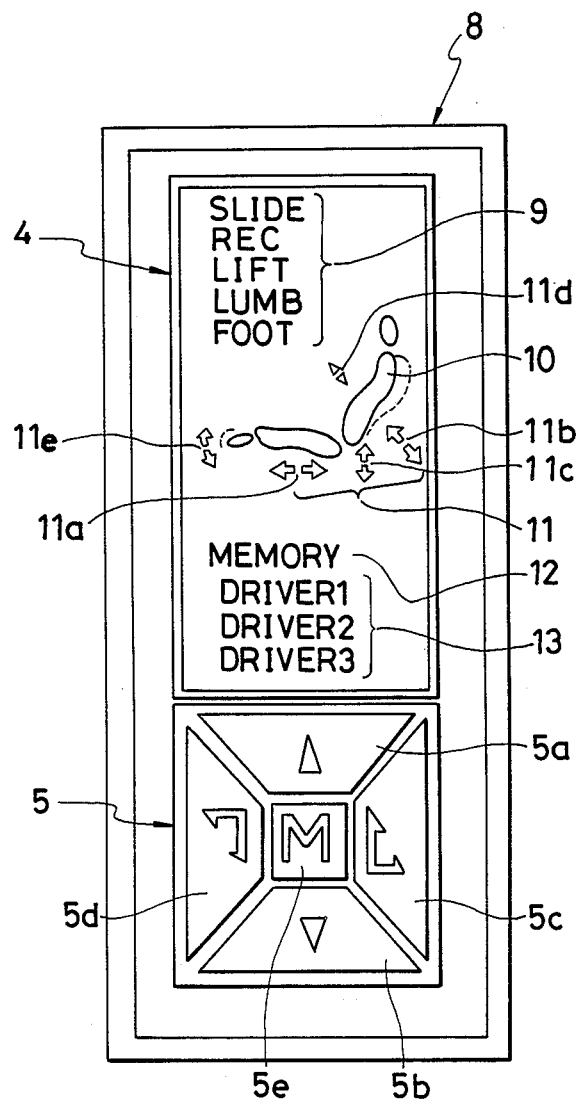
FIG. 2 is a plan view of an exemplary arrangement of a display/control unit employed in the apparatus according to the invention.

The control switch array 5 is combined with a display device 4 in a unit as shown in FIG. 2, which unit is referred to as the display/control unit and denoted generally by a reference numeral 8. The display/control unit 8 may be installed at a location where it can be visually observed and manipulated most conveniently by an occupant (e.g. driver or passenger sitting on the seat S). By way of example, the display/control unit 8 may be installed on an instrument panel of a motor vehicle or a side portion of the seat S.

There can be displayed on the image screen of the display device 4 incorporated in the display/control unit 8 a variety of information in the form of characters/graphic patterns which may include a control mode menu 9 indicating the various control modes of the individual parts of the seat S such as "SLIDE", "REC", "LIFT", "LUMB" and "FOOT" mode as mentioned hereinbefore and generally designated by a reference numeral 9, a picturesque seat attitude graphic 10, double-arrow marks generally denoted by 11 and positioned around the seat attitude graphic 10 in a number corresponding to that of the items included in the control mode menu 9 for indicating the directions in which the associated parts of the seat are adjusted (e.g. forward/backward adjustment or movement of the seat, increment and decrement of the seat attitude determining quantities), a message "MEMORY" 12 indicating storage of the seat attitude data in the memory unit 2, and a driver identification (ID) menu 13 including ID messages "DRIVER 1", "DRIVER 2" and "DRIVER 3". In the case of the illustrated embodiment, it is assumed that the display device 4 is constituted by a liquid crystal display. The variety of information mentioned above are selectively displayed under the control of the individual control switches included in the control switch array 5.

Figure 3:
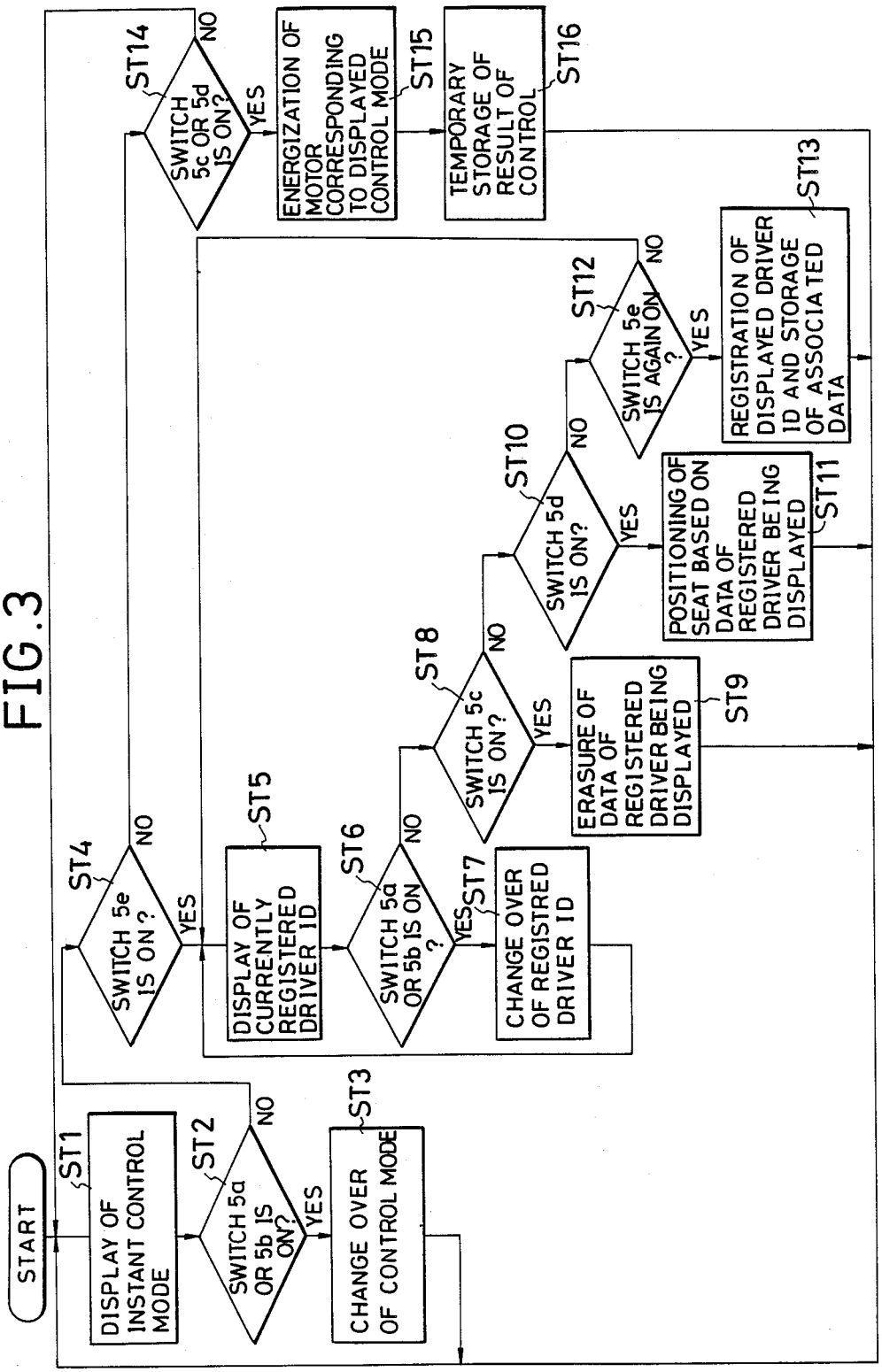
FIG. 3 is a view showing a flow chart for illustrating operation of the apparatus according to the invention.

Now, operation of the seat control apparatus of the structure described above will be elucidated by referring to the flow chart shown in FIG. 3, in which reference symbols ST1 to ST16 designates individual steps involved in the operation.

At the start of operation of the seat control apparatus (step ST1), there is displayed on the screen of the display device 4 of the display/control unit 8 the character information or message of the control mode selected from the mode menu 9 in the preceding operation. By way of example, it is assumed that the character information "SLIDE" is displayed. Additionally, there are displayed the double-arrow mark 11a associated with this control mode "SLIDE" and the seat graphic pattern 10 representing schematically the seat as a whole. In the case of the illustrative example now under consideration, it is assumed that the seat graphic 10 representing the seat is continuously displayed throughout the seat control operation and made to disappear upon completion thereof.

Subsequently, when the upper control switch 5a of the control switch array 5 is pushed, the "SLIDE" mode of the control mode menu 9 is changed over to the "REC" mode, whereupon the character string "REC" is displayed and at the same time the double arrow mark 11b associated with the "REC" mode is displayed. Through repetitive operation of this control switch 5a, the individual modes of the control mode menu 9 are sequentially changed over in the order from high to low rank mode (e.g. from the "SLIDE" mode to the "FOOT" mode in the case of the embodiment shown in FIG. 2) to be displayed in the corresponding order. Being interlocked with the sequential changeover of the control or adjustment modes, the associated double arrow marks 11 to be displayed simultaneously with the associated control modes are also changed over sequentially starting from the double-arrow mark 11a to the mark 11e in this order in the case of the illustrated arrangement. On the other hand, when the lower control switch 5b is operated repeatedly, the mode items of the control mode menu 9 are sequentially changed over to be individually displayed in the direction reverse to the case of the repeated actuation of the upper control switch 5a described above, that is, in the order from the "FOOT" mode to the "SLIDE" mode, being accompanied with the change-over of the associated double-arrow marks in the order from the mark 11e to the mark 11a (refer to steps ST2 and ST3 in FIG. 3).

Now assuming that a driver or occupant A desires to select the "SLIDE" mode from the mode menu 9. On the assumption, if the character information "SLIDE" is displayed together with the associated double-arrow mark 11a on the image screen of the display device 4 in succession to the start of operation of the seat control apparatus, it is then unnecessary to actuate both control switches 5a and 5b. Otherwise, either the control switch 5a or 5b has to be repeatedly pushed until the described character information "SLIDE" is displayed together with the associated double-arrow mark 11a.

When the display of the "SLIDE" mode message and the corresponding double-arrow mark 11a has been confirmed, the occupant A can then push, for example, the right-hand control switch 5c as viewed in the FIG. 2 (step ST14). In response thereto, the CPU 1 of the seat control apparatus causes the continuous display of the whole double-arrow mark 11a to be changed over to the flashing or flickering display only of the right-hand side arrow portion, whereupon the seat S is slidingly moved to the right (backward) under the control of CPU 1. This can be accomplished by rotating the motor M₁ in the reverse direction through the drive unit 7 in response to the detection of actuation of the control switch 5C under the control of the CPU 1 (step ST15). In this manner, adjustment of the horizontal disposition of the seat S in the rightward direction is carried out.

On the other hand, when the control switch 5d located at the left-hand side as viewed in FIG. 2 is actuated, only the left arrow of the double-arrow mark 11a is displayed in the flickering state, and at the same time the sliding adjustment of the horizontal disposition of the seat is carried out to the left as viewed in the figures (i.e. in the forward direction).

Through the similar procedure, the occupant of the seat S can select the adjustment or control mode "SLIDE", "REC", "LIFT", "LUMB" or "FOOT" by pushing the control switch 5a or 5b and adjust the attitude of the seat S so as to conform with the figure of the occupant by operating the other control switch 5c or 5d.

The attitude data of the various adjustable parts constituting the seat S obtained everytime each part is adjusted is detected by the sensors 6 provided in association with these seat parts, respectively, to be supplied to the CPU 1 through the imput/output interface 3. The CPU 1 then stores once the seat attitude data as fetched in a RAM (random access memory) constituting a part of the storage unit 2 (step ST16). Subsequently, when the occupant A pushes the memory switch 5e (step ST4), the character information "MEMORY" 12 is displayed on the screen of the display device 4, and at the same time one of the ID messages "DRIVER 1", "DRIVER 2" AND "DRIVER 3" is displayed in the flickering state (step ST5). This flickering display of the driver ID messages of the driver menu 13 can be sequentially changed over by operating repeatedly the control switch 5a or 5b in the order from the low to high rank (in the case of the illustrated example, from "DRIVER 3" to "DRIVER 1") or vice versa (steps ST6, ST7). In this manner, any one of the occupants, e.g. driver or passenger A, B and C, can select the desired one of the driver ID information "DRIVER 1", "DRIVER 2" and "DRIVER 3" by pushing first the memory switch 5e (step ST4) and then operating the control switch 5a or 5b (step ST6), whereby the selected one of the driver information is displayed flickering on the display screen 4 (step ST5).

By way of example, it is now assumed that the driver A desires to select the item "DRIVER 1" from the driver menu 13. In that case, when the item "DRIVER 1" is displayed flickering on the display screen 4 as the currently registered driver upon pushing of the memory switch 5e, it is then unnecessary to operate the control switch 5a or 5b. Otherwise, the driver A is required to operate repeatedly the control switch 5a or 5b until the menu item "DRIVER 1" makes appearance on the display. Subsequently, after having confirmed that the item "DRIVER 1" is displayed on the screen 4, the driver or occupant A again pushes the memory switch 5e (step ST12). In response thereto, the CPU 1 transfers the seat attitude data stored precedently to another RAM provided in association with the menu item "DRIVER 1" now being displayed flickering on the display device 4, whereby the seat attitude data of concern is stored in the abovementioned RAM (step ST13). In this manner, the seat attitude data for the driver or occupant A is registered in the memory allocated to the item "DRIVER 1" of the driver menu 13, whereupon the message "DRIVER 1" is changed over to the constant display in the steady state.

In the similar manner, the seat attitude data of another driver can be once stored previously in a RAM and then transferred for registration to another RAM or memory area allocated to the driver menu item DRIVER 2" or "DRIVER 3" as selected, if that RAM or memory area is available for the registration.

Now, description will be turned to the procedure through which the seat attitude data registered in association with the menu items "DRIVER 1", "DRIVER 2" and "DRIVER 3", respectively, of the driver menu 12 is utilized for controlling or adjusting the attitude of the seat S.

At first, the memory switch 5e is pushed (step ST4). Subsequently, either the control switch 5a or 5b is operated to cause that driver ID item of the driver menu 12 to be displayed in the flickering state for which the seat attitude data is to be retrieved (steps ST5 to ST7). In this connection, it is assumed that the driver item "DRIVER 1" corresponding to the seat attitude data for the driver A is selected and displayed flickering on the display device 4.

Next, the control switch 5d is pressed (step ST10). In response thereto, the CPU 1 reads out the seat attitude data corresponding to the "DRIVER 1" displayed on the screen 4 from the associated RAM, whereupon the motors $M_1$, $M_2$, $M_3$ and $M_4$ as well as the solenoid valve V are correspondingly driven on the basis of the seat attitude data as read out under the control of the CPU 1.

In this way, the individual parts of the seat S are adjusted in respect to the position and/or orientation by means of the motors $M_1$, $M_2$, $M_3$ and $M_4$ and the solenoid valve V on the basis of the seat attitude data for the driver ID item "DRIVER 1" under the control of the CPU 1, whereby the attitude of the seat S conforming to the figure of the driver or occupant A is reconstituted (step ST11). The setting of the seat attitudes for the other registered drivers identified by the driver menu items "DRIVER 2" and "DRIVER 3" can be accomplished through the similar procedure.

Next, procedure for erasing the seat attitude data registered under the driver ID items "DRIVER 1", "DRIVER 2" and "DRIVER 3" will be described.

First, the memory switch 5e is pressed (step ST4), being followed by actuation of the control switch 5a or 5b to display in flickering the driver ID item (e.g. "DRIVER 1" for which the seat attitude data is to be erased) (steps ST5, ST6 and ST7). Subsequently, the control switch 5c is pressed (step ST8). In response, the CPU 1 erases the seat attitude data for the driver ID item "DRIVER 1" flickering currently on the display device 4 from the associated RAM, whereupon the flickering display "DRIVER 1" is changed over to other driver ID item (step ST9). Through similar procedure, the seat attitude data for the menu items "DRIVER 2" and "DRIVER 3" can be erased. The memory areas or RAMs from which the seat attitude data have been erased in the manner described above can be loaded with fresh seat attitude data to be registered for new occupants or drivers through the aforementioned procedure (steps ST1 - ST3, ST14 - ST16, ST4 - ST7, ST12 and ST13) with the aid of the switches 5a to 5e.

In the foregoing description of the embodiment of the invention, it has been assumed that the control or adjustment modes selected from the control mode menu 9 as well as the driver ID item selected from the driver menu 13 through manipulation of the control switch array 5 are displayed in the form of character messages on the liquid crystal display device. It should however be understood that such a modification is possible in which LEDs or the like elements are provided at the beginnings of the character messages inscribed permanently and the LEDs are selectively energized through manipulation of the control switch array 5. Further, the seat control apparatus is not restricted to the application for the seat of motor vehicle, but can be applied to the seat in more general sense. Further, the number of the specified occupants which can be registered at one time is never restricted to that described above.

Although the invention has been described in conjunction with what is believed to be the preferred embodiment thereof, it goes without saying that numerous modifications and variations will be readily occur to those skilled in the art without departing from the spirit and scope of the invention set forth in the appended claims.

We claim:

1. A seat control apparatus, comprising:
   a plurality of seat attitude control means;
   means for storing seat attitude data appropriate to figures of specified occupants separately for each of said occupants, said seat attitude data being derived through said seat attitude control means;
   means for reconfiguring the attitude of the seat on the basis of said seat attitude data stored in said storage means;
   means for erasing said seat attitude data stored separately for each of said occupants;
   display means for displaying actions of said seat attitude control means and indicating said specified occupant; and
   manipulation means which comprises a switch array including four control switches and one memory switch, said four control switches serving for a plurality of adjustments of the attitude of said seat and said memory switch serving to register said specified occupants and the corresponding seat attitude data, two of said control switches and serving to select control modes for controlling said plural seat attitude control means from a control mode menu sequentially from the first to the last control modes or reversely.

2. A seat control apparatus according to claim 1, wherein said four control switches are disposed around said one memory switch at upper, lower, right and left sides thereof.

3. A seat control apparatus according to claim 2, wherein said four peripheral switches are so disposed so as to form a rectangular array.

4. A seat control apparatus according to claim 1, wherein the remaining two control switches serve to control the direction in which action of said seat attitude control means is exerted.

5. A seat control apparatus according to claim 1, wherein each of said control switches and said memory switch is realized in the form of a touch switch.

6. The seat control apparatus of claim 1, wherein said two control switches are located at the upper and lower sides, respectively of said memory switch.

7. The seat control apparatus of claim 4, wherein said remaining two control switches are located at the left and right sides, respectively, of said memory switch.

* * * * *